Dec. 16, 1924.

C. BECHTOLD 1,519,969

FACED CROWN AND METHOD OF MAKING THE SAME

Filed Jan. 20, 1923

Charles Bechtold INVENTOR

BY HIS ATTORNEY Frank Carlson

Patented Dec. 16, 1924.

1,519,969

UNITED STATES PATENT OFFICE.

CHARLES BECHTOLD, OF GLENDALE, NEW YORK.

FACED CROWN AND METHOD OF MAKING THE SAME.

Application filed January 20, 1923. Serial No. 613,922.

*To all whom it may concern:*

Be it known that I, CHARLES BECHTOLD, a citizen of the United States of America, and a resident of the county of Queens, city of Glendale, and State of New York, have invented a certain Faced Crown and Method of Making the Same, of which the following is a specification.

This invention relates to dental crowns and their manufacture, and more particularly to the class in which a gold crown is open faced and furnished with a setting for a poreclain facing and the latter finally inserted and sealed in position.

The main object of my invention is to provide a sanitary gold crown of this class whose structure method of manufacture increases greatly the strength of the crown, especially in regard to the setting of the porcelain facing, and which eliminates discoloration of the latter by any application of heat.

Further objects and attained advantages will become apparent as this specification proceeds.

Referring to the accompanying drawing forming part of this application,

Throughout the views, the same reference numerals denote the same parts.

Figure 1:
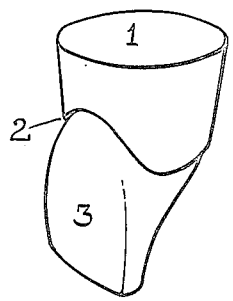
Fig. 1 is a view of a plaster model of a tooth trimmed to the gum line.
Figure 2:
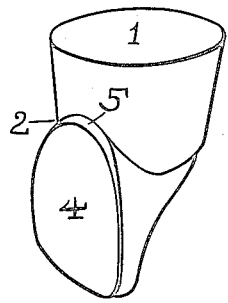
Fig. 2 is similar view of the same with a porcelain facing fitted to the face thereof.

When making faced crowns, or as they are also called, procelain veneer crowns, there is always a tendency to badly discolor the porcelain facing owing to the fact that it is customary to first assemble the facing and its gold backing and thereafter insert the same into the crown involved and solder the whole in position. It is the application of the heat during this operation that inflicts the damage to the porcelain.

However, it is herein proposed to introduce an entirely different and novel method of making a faced crown in which the facing is never heated.

The preliminary steps taken by a dentist in order to prepare a tooth for a crown and furnishing the data from which to make the crown are, of course, as usual. However, for the sake of completeness in disclosing the whole method, it may be well to follow the whole process, including the old and well known steps, some of which are illustrated.

A tooth to be provided with a crown is separated from the adjoining teeth by means of the rotary disk, the mesial and distal sides are rounded off toward the facial. Then it is shortened, ground off facially to accommodate a facing, and thereafter, the bite is relieved. A plaster impression is now made of the tooth and the wire measurement taken of the neck of the same, and further, a wax bite of the tooth and those adjoining and opposite is gotten. These three known forms of data provide the basis of the work to be performed and are submitted for making a crown. As these steps are all common practice, it seems superfluous to illustrate them.

Taking the plaster impression, a plaster cast 1 is made therein to form a model of the ground tooth, the same being trimmed all around as at 2 to the gum line to conform with the wire measure. The plaster model is placed in the wax bite, the adjoining and opposite teeth being poured in plaster, the whole set into an articulator and the wax boiled off. Thus far, only common practice has been followed and illustration of any of these parts or steps are not essential except as to the one plaster model 1 with which the work was begun. Upon the face 3 of the model is fitted a porcelain facing 4, the latter being levelled and ground at the top 5 to the gum line and hollow ground in the rear side to make a perfect fit on the model face and to bring the facing in line with the adjacent teeth.

Figure 3:
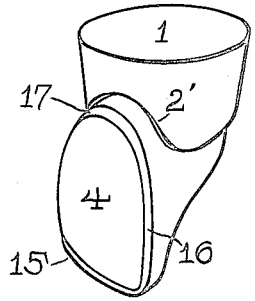
Fig. 3 is a similar view of the same wherein the gum line has been trimmed higher, the porcelain furnished with a gold backing and the latter waxed into position on the face of the plaster model.
Figure 4:
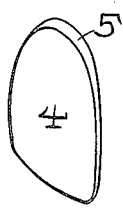
Fig. 4 is a view of the mentioned porcelain facing alone.
Figure 5:
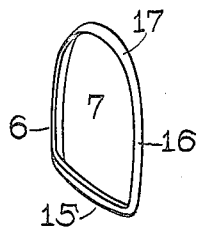
Fig. 5 is a view of the gold backing for said facing.
Figure 6:
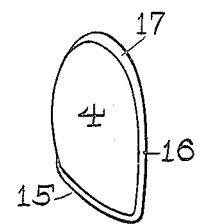
Fig. 6 is a view of the facing and its backing when assembled.
Figure 7:
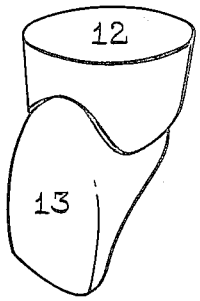
Fig. 7 is a view of a fusible metal duplicate of the plaster model with its gold backed porcelain facing of Fig. 3.
Figure 8:
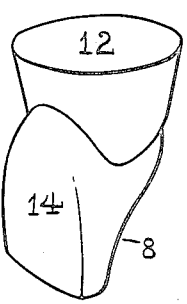
Fig. 8 is a further view of the same with a piece of gold swedged and shaped into a crown about said metal model.

When a perfect fit, the casing is furnished with a gold backing 7 which is made to conform perfectly with the rear of the facing and face 3 of the model. The edges 6, 15, 16 and 17 are shaped up about the facing and made to overlap the edges of the same to secure the latter in a continuous setting. The model is again trimmed at 2' beyond the gum margin. The assembled facing and backing are at this juncture waxed into position on model 1 as in Fig. 3, the superfluous wax being trimmed off to present a perfect model tooth, care being taken to free and expose the edges of the backing all around. A fusible metal duplicate 2 is now made of this assembly, as shown in Fig. 7, and a seamless gold tube 8 with a lower closed end is swedged onto the metal model 12 as in Fig. 8, the face 14 of the gold being later removed to expose within a margin the metal face 13 of the model.

Figure 9:
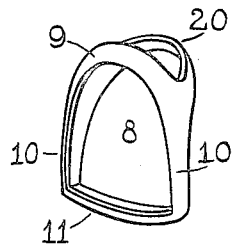
Fig. 9 is a view of the gold crown after being open faced and the fusible metal has been removed.
Figure 10:
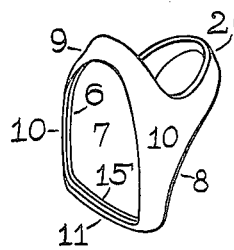
Fig. 10 is a similar view of said crown with the gold backing of Fig. 5 inserted therein.
Figure 11:
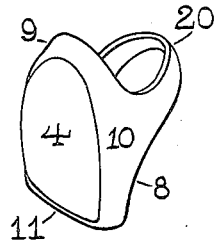
Fig. 11 is a further view of the same with the porcelain facing of Fig. 4 in position this assembly being made in accordance to my invention.

The fusible metal, having served its purpose, is then removed, now presenting the gold tube as a crown shown in Fig. 9. The gold backing and porcelain facing are at this point carefully separated, the backing inserted within the edges 9, 10, 10 and 11 and the edges 17, 6, 16 and 15 of the backing soldered thereto. The backing is thus a unit with the crown as in Fig. 10. The side edges 10, 10 and tip edge 11 of the crown and edges 6, 16 and 15 of the backing are spread a little, and the porcelain facing inserted. The side edges and tip edge are carefully tapped into perfect contact with the facing as in Fig. 11. The finishing of the crown consists in face filing the edges across the facing and finally running a finishing chisel all around the facing to turn in and clean the edges and form a sanitary and permanent seal about the facing.

Figure 12:
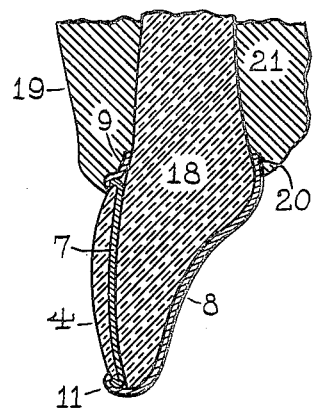
Fig. 12 is a vertical section of a tooth provided with a faced crown embodying my invention.

In Fig. 12 we have a sectional view of a tooth 18 provided with a crown as made by the foregoing method, the edges 9 and 20 of the crown projecting beneath gums 19 and 21. It is also clearly seen that the facing is not merely held by the crown edges alone, but also by the edges of the backing, providing a double setting and seal.

Having thus fully described my invention and method of making the same, I claim,

1. A dental crown adapted to fit a tooth, a backing secured within an open area upon the face of said crown, a facing upon said backing, an enveloping edge upon the backing retaining said facing and an exterior marginal edge upon said crown proper enveloping said backing edges and forming a second finishing seal about said facing.

2. A dental crown adapted to fit a tooth, a backing secured within an open area upon the face of said crown, a facing located upon said backing, a continuous marginal edge upon the backing completely enveloping the edges of said facing to secure the same, and a retaining edge upon said crown securing said backing in position and comprising a reinforcement for the marginal retaining edge of said backing.

3. A dental crown adapted to fit a tooth, a backing secured within an open area in said crown, a facing located in said open area upon said backing, and a continuous peripheral retaining edge upon said backing and a marginal edge upon said crown made integral with said backing edge upon all sides to completely envelop the entire peripheral edge of said facing to retain the same.

4. In a dental crown adapted to fit a tooth having a backing secured within an open area in said crown and a facing located in said open area upon said backing, a marginal edge upon said backing enveloping the entire periphery of said facing and a similar marginal edge upon said crown also enveloping the entire peripheral edge of said facing and the entire peripheral edge of said backing to reinforce the same.

5. The method of producing a dental crown which consists in taking a cap having an opening upon one side, the said opening being provided with a continuous retaining edge, forming a backing for a crown facing and providing the same with forwardly projecting peripheral edges, securing said backing in said cap within said aperture so that the retaining edge of said cap contacts with the peripheral edge of the backing, inserting a facing in said aperture against said backing, and finally securing said facing in position by forcing over the peripheral edges of the backing and the retaining edge of the cap to form a double seal upon the entire periphery of said facing, with both retaining edges of the cap and the backing retaining the same facing edge.

Signed at 226 Flatbush Ave., in the borough of Brooklyn, county of Kings, city and State of New York, this 27th day of December, 1922.

CHARLES BECHTOLD.

Witnesses:
V. H. JACOBSON,
C. F. WM. FORSSBERG.